United States Patent [19]

Matsuura et al.

[11] Patent Number: 5,068,677
[45] Date of Patent: Nov. 26, 1991

[54] LASER SCANNER WITH SELECTED PLURAL BEAM SOURCES

[75] Inventors: Kazuo Matsuura; Hitoshi Sekino; Keizo Nishiguchi; Narutaka Yoshida, all of Osaka, Japan

[73] Assignee: Minolta Camera Kabushiki Kaisha, Osaka, Japan

[21] Appl. No.: 595,688

[22] Filed: Oct. 5, 1990

Related U.S. Application Data

[63] Continuation of Ser. No. 409,102, Sep. 19, 1982, abandoned.

[30] Foreign Application Priority Data

Sep. 20, 1988 [JP] Japan .................. 63-235860
Sep. 20, 1988 [JP] Japan .................. 63-235861
Sep. 20, 1988 [JP] Japan .................. 63-235862

[51] Int. Cl.$^5$ .................. G01D 15/16; G02B 26/08
[52] U.S. Cl. .................. 346/108; 359/217; 359/206
[58] Field of Search .................. 346/76 L, 107 R, 108, 346/160; 358/296; 350/6.5, 6.6, 6.8

[56] References Cited

U.S. PATENT DOCUMENTS 4,312,588 1/1982 Minoura et al. .................. 346/160
4,367,009 1/1983 Suzki .................. 350/6.5
4,393,387 7/1983 Kitamura .................. 346/108
4,404,571 9/1983 Kitamura .................. 346/108

FOREIGN PATENT DOCUMENTS

58-79215 5/1983 Japan .
58-95361 6/1983 Japan .
60-32019 2/1985 Japan .
60-201319 10/1985 Japan .

*Primary Examiner*—Mark J. Reinhart
*Attorney, Agent, or Firm*—Price, Gess & Ubell

[57] ABSTRACT

A laser beam scanning apparatus includes plural laser beam sources for emitting laser beams modulated by a picture signal and having different characteristics from each other, a beam composition device for composing the beams emitted from the sources to form one laser beam, a deflecting device for deflecting the composite beam in a main scanning direction, and a beam splitter for splitting the deflected beam on the basis of the characteristic thereof. The apparatus further includes a beam-selecting device for selecting the beam in correspondence with the characteristic of the beam split by the splitter so as to transmit the beam with a specified characteristic and reflect the beam with a characteristic different from that of the transmitted beam.

15 Claims, 5 Drawing Sheets

LASER SCANNER WITH SELECTED PLURAL BEAM SOURCES

This is a continuation of application Ser. No. 409,102, filed on Sept. 19, 1989 now abandoned.

BACKGROUND OF THE INVENTION

The present invention relates to a laser beam scanning apparatus in which a laser beam of which the luminance is modulated on the basis of a picture signal is deflected in a main scanning direction so as to illuminate on a substance to be illuminated, and, for example, may be used as an exposure means for a photosensitive member which is arranged in an image forming apparatus such as a laser printer.

An image forming apparatus such as a printer or a display unit is provided with a scanning apparatus for modulating the luminance of a light on the basis of a specified signal and illuminating the modulated light on a substance to be illuminated such as sensitive member, a photographic film or a screen.

In such a scanning apparatus, a laser beam source capable of obtaining a very small spot serving as a light source is employed, and then in order to prevent a laser beam emitted from the laser beam source from accidentally inserting into eyes of an operator, it is required to cover the apparatus with a light-intercepting cover under the safety standard In the apparatus, as a deflecting means, there have been known means for rotating a polygonal mirror, means for oscillating a galvano mirror, means for rotating a hologram, etc. In the means, the first means for rotating a polygonal mirror is best generalized because of simple construction thereof as compared with the construction of the other means.

Since when the laser beam is deflected by a polygonal mirror, the scanning speed is in proposition to the number of rotation of the polygonal mirror, it is preferred to increase the rotational speed of the polygonal mirror in order to scan at high speed. However, this solution has some limitation such as the durability of a motor for rotating the mirror and the material of the mirror. Similarly, the other means have various kinds of problems to be solved for high speed operation in the mechanisms thereof, including a transfer time for transferring a picture data.

Therefore, specially, in a high-speed printer, plural laser beams modulated on the basis of different signals are employed, and those beams are simultaneously deflected to simultaneously scan plural parts of a substrate to be illuminated, resulting in achievement of the scanning operation at substantial several times higher speed than that of a normal speed printer.

On the other hand, in a scanning apparatus provided in a multi-color printer or a two-color printer which has a black and a white toners, more than two laser beams modulated on the basis of signals corresponding to individual color images are illuminated on different parts of a substance to be illuminated or substances to be illuminated to form multi-color images.

In the scanning apparatus utilizing such plural laser beams, in order to become small in construction and cheaper in manufacturing cost, there has been proposed an apparatus in which each laser beam is deflected by one deflecting means.

In the apparatus in which the one deflecting means is used in common as described above, there have been proposed an apparatus in which the incident angle of each laser beam incident on the means is different from each other, and an apparatus in which each laser beam is incident on the means while spacing each other. The former has bad constant velocity linearity of the scanning locus on a substance to be illuminated, while the latter is required to provide a large deflecting means having a big plane of incidence and has bad constant velocity linearity of the scanning locus on a substance to be illuminated.

Therefore, the conventional apparatus is provided with plural laser beams having individual characteristics such as wavelengths or polarizing directions. Then, these beams are composited to form one laser beam and then the laser beam is deflected in a main scanning direction. After that, the beam is split into plural laser beams, which are before composition, on the basis of the individual characteristic which each laser beam before composition has. Each of the split laser beams illuminates on a different part of a substance to be illuminated.

For example, in Japanese Laid-open Patent Publication No. 60-32019, there is disclosed an apparatus in which, in order to perform the high-speed scanning operation, two laser beams having different polarizing directions are composed and then deflected by a polygonal mirror, and the deflected laser beams are split by a polarizing beam splitter. In another Japanese Laid-open Patent Publication No. 60-201319, there is disclosed a scanning apparatus suitable for a color printer in which three laser beams with different wavelengths from each other are composed and split.

Generally, a beam splitter, by which after one laser beam composed plural laser beams is deflected, the laser beam is split on the basis of the characteristic of each laser beam before composition, employs a dichroic mirror with a partial reflective film for transmitting a laser beam with the specified characteristic and reflecting a laser beam with the other specified characteristic.

The dichroic mirror is so constructed that the surface of a transmitting material such as an optical glass is covered with a partial reflective film composed of a dielectric multilayer film or a metal-dielectric multilayer film. The mirror has the selectivity with respect to the wavelength or the polarized direction of a laser beam.

However, since the use of the partial reflective film with the excellent selectivity do not allow a laser beam to split completely, the transmitting beam transmitted the film and the reflective beam reflected by the mirror include the other laser beam with the different characteristic, respectively.

Therefore, when each of the split laser beam illuminates on the different part of a substance to be illuminated to form an image, it causes such a problem, called as a "ghost", that the image to be formed on the other part is unnecessarily overlapped on a desired image.

SUMMARY OF THE INVENTION

An essential object of the present invention is to provide a laser beam scanning apparatus which can form a high quality image without a ghost.

Another important object of the present invention is to provide a laser beam scanning apparatus which can prevent the manufacturing cost thereof from increasing.

A further object of the present invention is to provide a laser beam scanning apparatus which can prevent the number of parts thereof from increasing and form a high quality image without a ghost.

In accomplishing these and other objects, a laser beam scanning apparatus according to the present invention comprises a laser beam scanning apparatus comprising:

plural laser beam sources for emitting laser beams modulated by a picture signal and having different characteristics from each other;

a beam composition means for composing the beams emitted from the laser beam sources to form one laser beam;

a deflecting means for deflecting the composite laser beam in a main scanning direction thereof;

a beam splitter for splitting the deflected laser beam on the basis of the characteristic of the laser beam; and a beam-selecting means for selecting the laser beam in correspondence with the characteristic of the laser beam split by the splitter, the beam-selecting means arranged between the splitter and the substance to be illuminated on an optical path of the beam, wherein each split laser beam illuminates on a different part of a substance to be illuminated.

By the above construction of the present invention, since the purity of the characteristic of each split laser beam increases, it is possible to form a high quality image without a ghost.

In another aspect of the present invention, there is provided the laser beam scanning apparatus in which the splitter has a partial reflective film for splitting an incident light into a reflective light and a transmitting light, the beam-selecting means has a partial reflective film with the same characteristic as such a characteristic of the film of the splitter that the reflective light from the splitter is reflected thereby and the transmitting light is transmitted it.

By the construction according to the present invention, since the beam composition means, the beam splitter, and the beam-selecting means are composed of the same partial reflective film with the same characteristic, the manufacturing costs of the means may be reduced, as compared with the case where those means are composed of various kinds of partial reflective films with the different characteristics from each other respectively.

In a still another aspect of the present invention, there is provided the laser beam scanning apparatus further comprises an optical member for correcting an error of an incline angle of the deflecting means, the member being arranged between the splitter and the substance on the optical path of the laser beam split by the splitter, wherein the beam-selecting means is composed of a partial reflective film covered the optical member.

By the construction according to the present invention, the beam-selecting means is arranged therein, a new supporting member may not be required, with the result that it may prevent the manufacturing and assembling costs from increasing.

In further aspect of the present invention, there is provided the laser beam scanning apparatus further comprising a box-like light-intercepting cover for accommodating the sources, the beam composition means, the deflecting means, and the splitter, wherein each laser beam split by the splitter is transmitted a light transmission member covering an exit opening formed on the cover to illuminate on a different part of a substance to be illuminated arranged outside the cover, and the beam-selecting means is a dielectric multilayer film for selectively transmitting the laser beam split by the splitter and then incident on the light transmission member, which is formed on a surface of the light transmission member.

By the construction according to the present invention as described above, the transmitting material for covering the exit opening of the light-intercepting cover has the function of a dichroic mirror, resulting in very small absorption loss thereof. Therefore, a laser beam with sufficient quantity of light may be emitted even from a lower powered laser beam source to illuminate a substance to be illuminated. Furthermore, the apparatus may be prevent the number of the parts thereof from increasing and prevent from occurring a ghost.

In a still further aspect of the present invention, there is provided the laser beam scanning apparatus in which the dielectric multilayer film covers an inner surface of the light transmission member where is located inside the cover.

By the construction thereof, since the dielectric multilayer film covers the inner surface of the light transmission member, it may be prevented a damage of the film from occurring.

In an aspect of the present invention, there is provided a laser beam scanning apparatus comprising: plural laser beam sources for emitting laser beams modulated by a picture signal and having different characteristics from each other; a beam composition means for composing the beams emitted from the laser beam sources to form one laser beam; a deflecting means for deflecting the composite laser beam in a main scanning direction thereof; a beam splitter for splitting the deflected laser beam on the basis of the characteristic of the laser beam; and a beam-selecting means for selecting the laser beam in correspondence with the characteristic of the laser beam split by the splitter, wherein each split laser beam illuminates on a different part of a substance to be illuminated, the splitter is so constructed that two optical glass-made prisms are closely attached to each other and a first dielectric multilayer film for transmitting the laser beam with a specified characteristic and reflecting the laser beam with a characteristic different from that of the transmitted laser beam is arranged therebetween, a second dielectric multilayer film for selectively transmitting the laser beam covers an exit surface of the splitter where the laser beam transmitted the first dielectric multilayer film falls on, and the beam-selecting means are the first and second dielectric multilayer films.

In an aspect of the present invention, there is provided a laser beam scanning apparatus comprising: plural laser beam sources for emitting laser beams modulated by a picture signal and having different characteristics from each other; a beam composition means for composing the beams emitted from the laser beam sources to form one laser beam; a deflecting means for deflecting the composite laser beam in a main scanning direction thereof; a beam splitter for splitting the deflected laser beam on the basis of the characteristic of the laser beam; and a beam-selecting means for selecting the laser beam in correspondence with the characteristic of the laser beam split by the splitter, wherein each split laser beam illuminates on a different part of a substance to be illuminated, the splitter is so constructed that two optical glass-made prisms are closely attached to each other and a first dielectric multilayer film for transmitting the laser beam with a specified characteristic and reflecting the laser beam with a characteristic different from that of the transmitted laser beam is arranged therebetween, a third dielectric multilayer film for selectively transmitting the laser beam covers an exit surface of the splitter where the laser beam reflected by the first dielectric multilayer film falls on, and the beam-selecting means are the first and third dielectric multilayer films.

By the arrangements thereof, the beam splitter is so constructed that the first dielectric multilayer film is arranged between the optical glasses and has the large mechanical strength, and the exit surfaces of the splitter are covered with the second and third dielectric multilayer films to form the dichroic mirrors, respectively. Therefore, the apparatus may have very small adsorption loss thereof, and a laser beam with sufficient quality of light may be emitted even from a lower powered laser beam source to illuminate on the substance to be illuminated. Furthermore, the apparatus may prevent the number of the parts thereof from increasing and increase the purity of the characteristic of each laser beam. Moreover, the apparatus may form a high quality image without a ghost. Additionally, the apparatus may keep the angles confronting the first dielectric multilayer film with the second and third dielectric multilayer films constant, resulting in the stability of the wavelength selective characteristic with respect to each split laser beam.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE PREFERRED EMBODIMENTS

Figure 1:
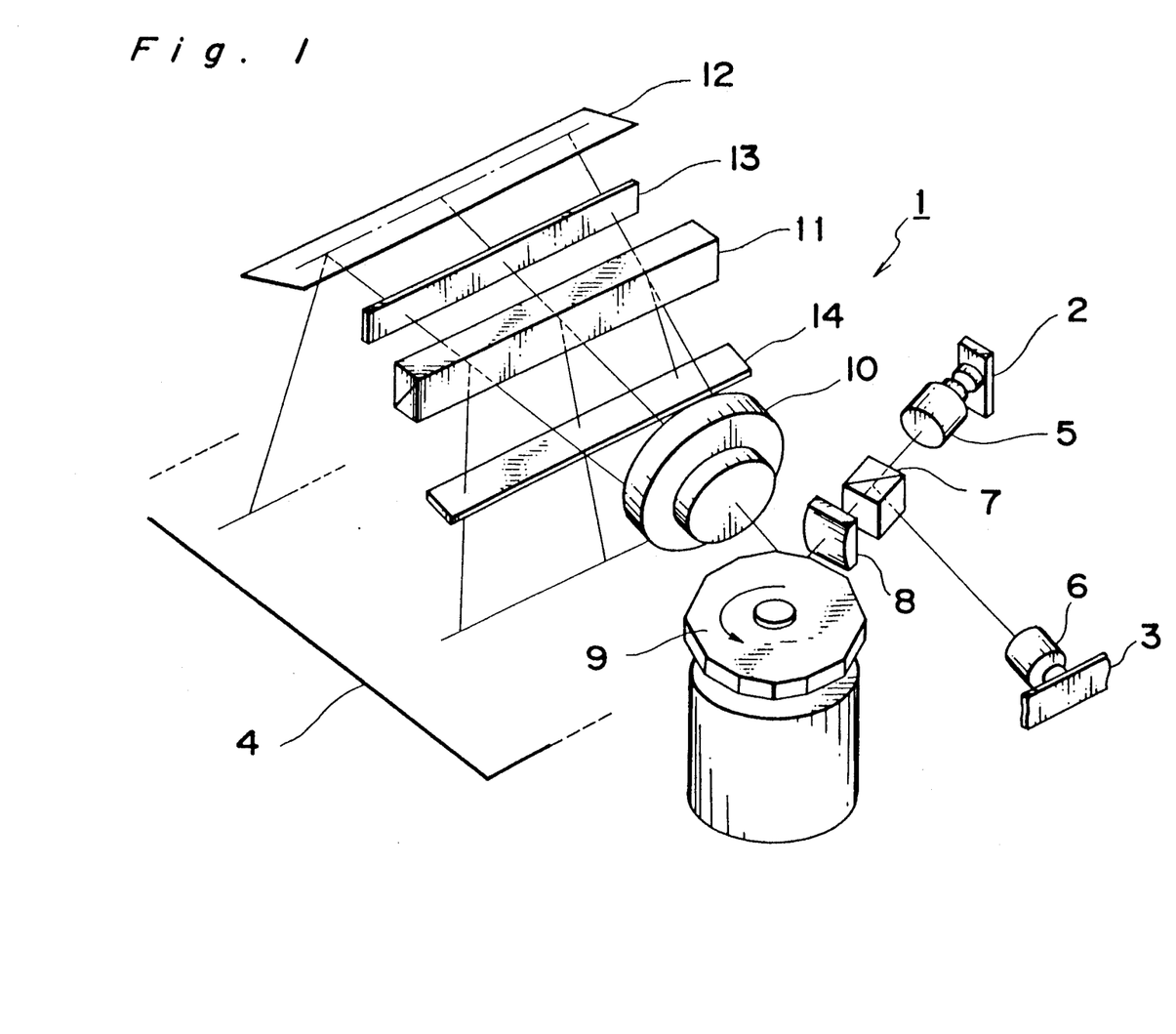
FIG. 1 is a perspective view showing a laser beam scanning apparatus according to the preferred first embodiment of the present invention.
Figure 2:
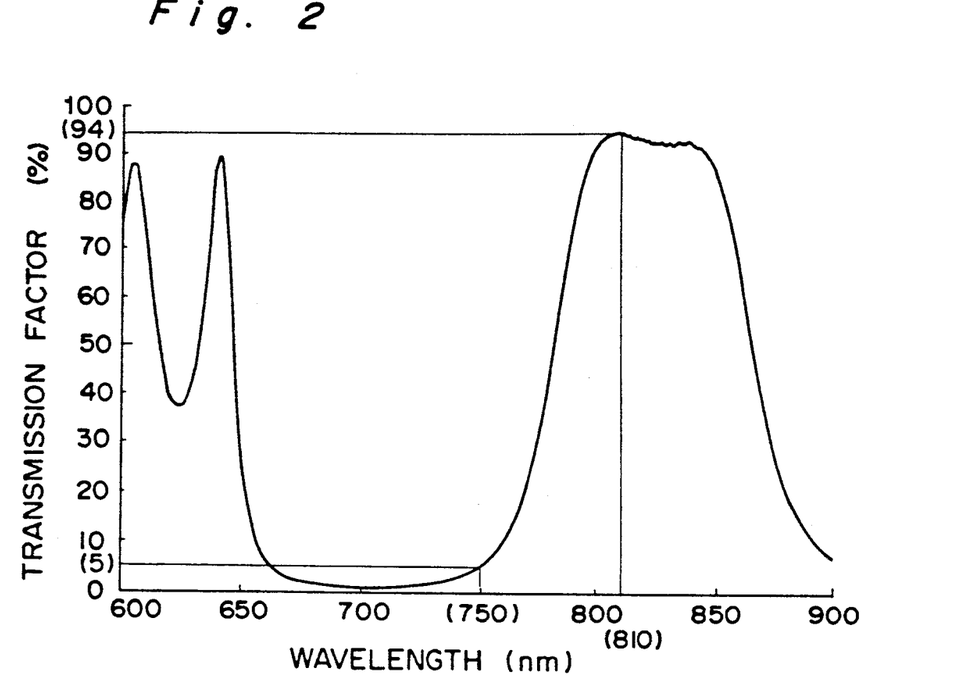
FIGS. 2 and 3 are graphs showing optical characteristics of dichroic mirrors in the first embodiment.
Figure 3:
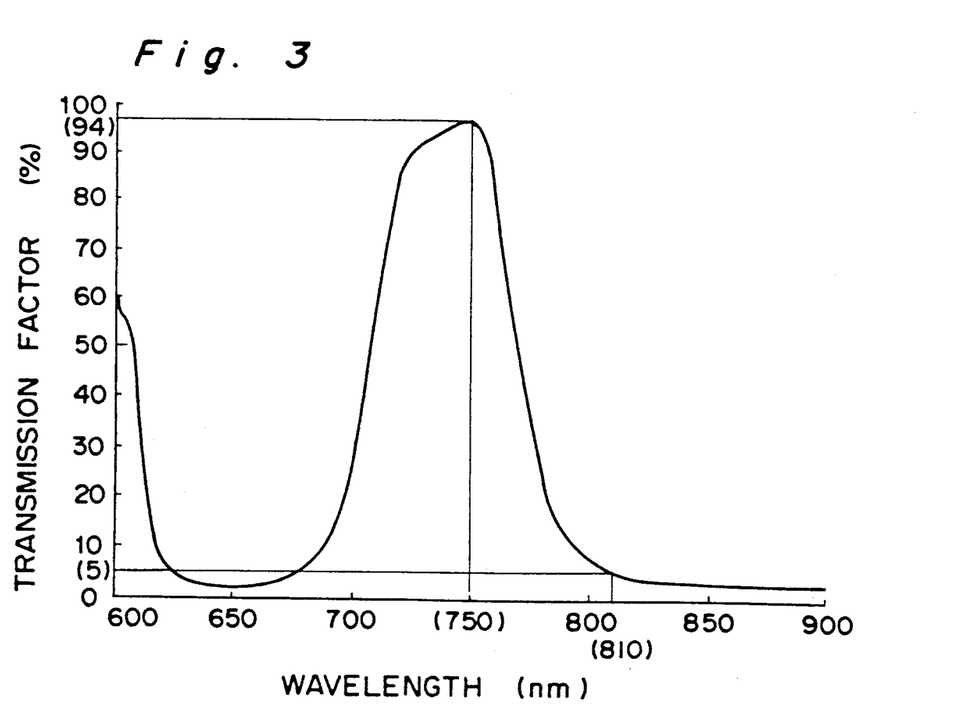
Figure 4:
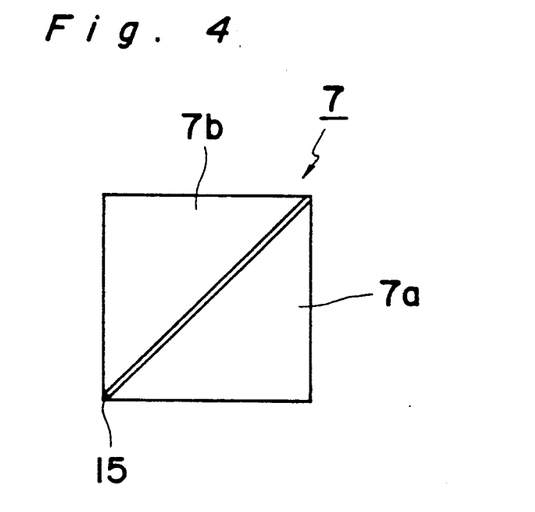
FIG. 4 is a front view showing a dichroic prism in the first embodiment.

FIG. 1 is a perspective view showing a laser beam scanning apparatus 1 according to the one preferred embodiment of the present invention, FIGS. 2 and 3 are graphs showing the optical characteristics of dichroic mirrors in the embodiment, and FIG. 4 is a front view of a dichroic prism in the embodiment.

In the scanning apparatus 1, in order to obtain two laser beams, two semiconductor lasers 2 and 3, serving as laser beam sources, for emitting two laser beams with the oscillation wavelengths of 810 nm and 750 nm, respectively, are arranged. The luminances of the beams emitted from the lasers 2 and 3 are respectively modulated by a control circuit (not shown) on the basis of a corresponding picture signal. The wavelengths of the beams are selected taking into consideration for the stability of the spectral sensitivity and oscillation characteristic of a photosensitive member 4 to be illuminated.

Divergent laser beams emitted from the lasers 2 and 3 pass through collimator lenses 5 and 6 to form collimated beams for falling on a dichroic prism 7 serving as a beam composition means.

As shown in FIG. 4, the prism 7 is comprised of two rectangular prisms 7a and 7b put on each other inserting a dielectric multilayer film, that is, a partial reflective film, 15 therebetween. The film 15 has the optical characteristic to transmit most of the laser beam of the 810 nm wavelength and to reflect most of the laser beam of the 750 nm wavelength as shown in FIG. 2.

The beams emitted from the semiconductor lasers 2 and 3 is composed so that the optical axis of one of the laser beams may generally coincide with that of the other laser beam by the prism 7 so as to form a laser beam.

The composite laser beam is incident on a polygonal mirror 9 through a cylindrical lens 8 to correct an error of an incline angle of each face of the polygonal mirror 9.

The polygonal mirror 9 rotates in a direction shown by an arrow at high speed to repeatedly deflect the incident laser beam in a main scanning direction of the apparatus. A f-θ lens 10 is arranged for keeping the scanning speed of the laser beam on the photosensitive member 4 to be illuminated constant.

The laser beam passed through the f-θ lens 10 is split into two laser beams by a beam splitter 11.

The splitter 11 is composed of a dielectric multilayer film with the wavelength selective characteristic similar to that of the prism 7. That is, since by the splitter 11, most of the laser beam with the 810 nm wavelength is transmitted, while most of the laser beam with the 750 nm wavelength is reflected, the laser beam emitted from one of the semiconductor laser 2 is transmitted the splitter 11, is reflected bending the optical path by a mirror 12, and then falls on the photosensitive member 4 to be illuminated. On the other hand, the laser beam emitted from the other semiconductor laser 3 is reflected by the splitter 11 and then falls on the photosensitive member 4 to be illuminated. The photosensitive member 4 to be illuminated may be so constructed that every part illuminated by each laser beam is independent of each other.

On the other hand, the splitter 11 can not completely split the beam into two laser beams. That is, as it is clear from FIG. 2, in the laser beam of the 810 nm wavelength, 94 per cent of the beam in strength is transmitted the splitter 11 and if it pays no attention to a little absorption, the remaining 6 per cent in strength of the laser beam is reflected thereby as a poor split beam together with the laser beam of the 750 nm wavelength. Conversely, in the laser beam with the 750 nm wavelength, 95 per cent of the beam in strength is reflected by the splitter 11, and the remaining 5 per cent of the laser beam in strength is transmitted it as a poor split beam together with the laser beam of the 810 nm wavelength.

Then, in the embodiment, dichroic mirrors 13 and 14 serving as a beam-selecting means are provided. The beam-selecting means, the mirrors 13 and 14, prevent the poor split beam not to be split by the splitter 11, which causes a ghost, from falling on the photosensitive member 4 to be illuminated.

The dichroic mirror 13 is arranged between the splitter 11 and the mirror 12, and has the completely same wavelength selective characteristic shown in FIG. 2 as that of the splitter 11. Therefore, the strength of the laser beam of the 750 nm wavelength, which is mixed in the transmitting beam transmitted the dichroic mirror 13, is 0.25 per cent (0.05×0.05) of the strength of the laser beam of the 750 nm wavelength when the laser beam of the 750 nm wavelength is incident on the splitter 11.

The dichroic mirror 14 is arranged between the splitter 11 and the photosensitive member 4 to be illuminated, and has the optical characteristic, shown in FIG. 3, different from those of the splitter 11 and the mirror 13. That is, as it is clear from FIG. 3, the mirror 14 has such a wavelength selective characteristic that 97 per cent of the laser beam of the 750 nm wavelength in strength is transmitted the splitter 11 and 95 per cent of the laser beam of the 810 nm wavelength in strength is reflected thereby. Therefore, the strength of the laser beam of the 810 nm wavelength which is the poor slit beam mixed in the laser beam of the 750 nm wavelength which is transmitted the dichroic mirror 14, is 0.3 per cent (0.06×0.05) of the strength of the laser beam of the 810 nm wavelength when the laser beam thereof is incident on the splitter 11.

The beam-selecting means is arranged on the optical path in which each laser beam slit by the splitter 11 progresses towards the photosensitive member 4 to be illuminated, so that the strength of the poor slit beam mixed in each laser beam illuminating each part of the photosensitive member 4 to be illuminated reduces to a non-sensitive small value.

The dichroic mirrors 13 and 14 are supported to adjust the angles thereof so that the laser beam reflected thereby may not illuminate the photosensitive member 4.

The beam-selecting means may be the means including the partial reflecting film such as the dichroic mirror, or a substance for transmitting the required laser beam and absorbing the other laser beam such as a color glass filter, or a polarized plate, and is preferable to employ a partial reflective film, specially dielectric multilayer film, resulting in very small absorption loss. Additionally, since such a beam-selecting means is composed of a film-like substance, no larger space for arrangement thereof is required and the means may advantageously use as the space for arrangement of the means the surface of a member for composing the optical path of a beam splitter etc. as described in the second to fifth embodiments as shown in FIGS. 5 to 8 respectively.

Figure 5:
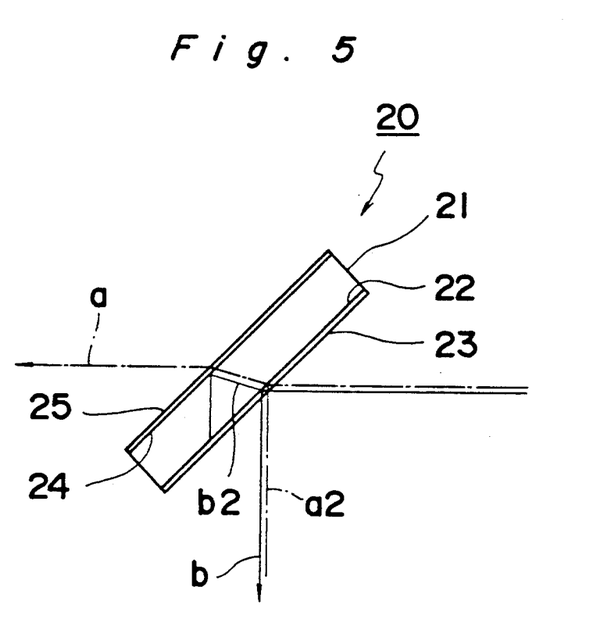
FIGS. 5 and 6 are enlarged sectional views showing beam splitters with beam-selecting means according to the second and third embodiments, respectively.

FIG. 5 is a sectional view showing a beam splitter 20 in the second embodiment.

In the splitter 20 shown in FIG. 5, a dielectric multilayer film 23 to transmit the laser beam (a) of the 810 nm wavelength and to reflect the laser beam (b) of the 750 nm wavelength is evaporated on the plane 22 of incidence of a flat optical glass 21. On the exit surface 24 thereof, a dielectric multilayer film 25 serving as the beam-selecting means which has the same laminated construction as that of the film 23 is evaporated.

Thus, the poor split beam (b2) transmitted the film 23 is reflected by the film 25 and only the laser beam (a) is transmitted the film 25. The laser beam reflected by the film 23 is a laser beam mixed the laser beam (b) with the poor split laser beam (a2). Therefore, when the splitter 20 is employed instead of the splitter 11 in the first embodiment shown in FIG. 1, the dichroic mirror 13 may be omitted.

Figure 6:
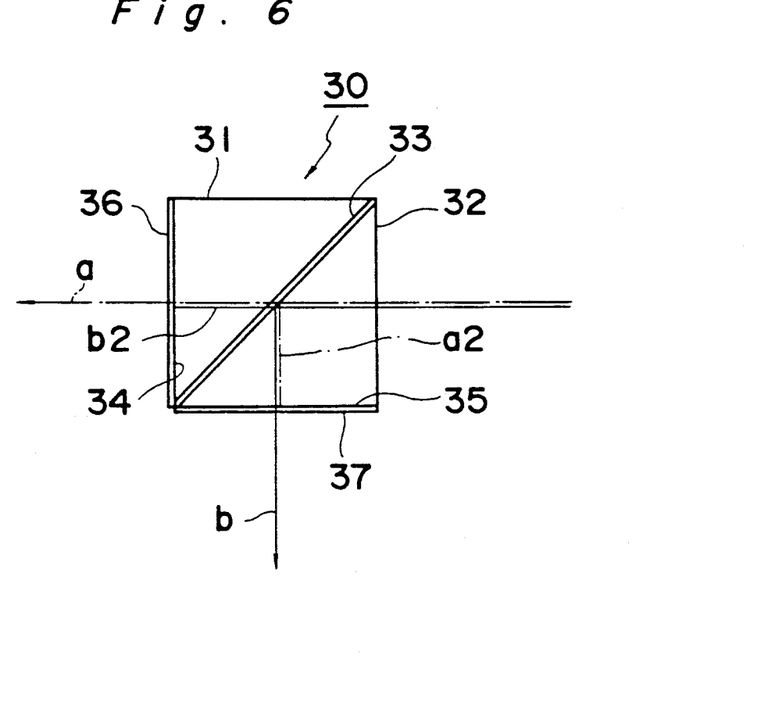

FIG. 6 is a sectional view showing a beam splitter 30 in the third embodiment.

The splitter 30 shown in FIG. 6 is so constructed that two optical glass-made rectangular prisms 31 and 32 attached to each other and that a first dielectric multilayer film 33 for transmitting the laser beam (a) of the 810 nm wavelength and reflecting the laser beam (b) of the 750 nm wavelength is arranged between the prisms 31 and 32.

On the exit surfaces 34 and 35 each corresponding to the split laser beams (a) and (b), a second and a third dielectric multilayer films 36 and 37 having the wavelength selective characteristics with respect to the laser beams (a) and (b), respectively, are arranged.

The second film 36 has the same characteristic as that of the first film 33, while the third film 37 has the wavelength selective characteristic to reflect the laser beam (a) of the 810 nm wavelength and to transmit the laser beam (b) of the 750 nm wavelength. These films 36 and 37 prevent the poor split beam from transmitting them respectively. Therefore, when the splitter 30 is employed instead of the splitter 11 in the first embodiment shown in FIG. 1, the dichroic mirrors 13 and 14 may be unnecessary.

Figure 7:
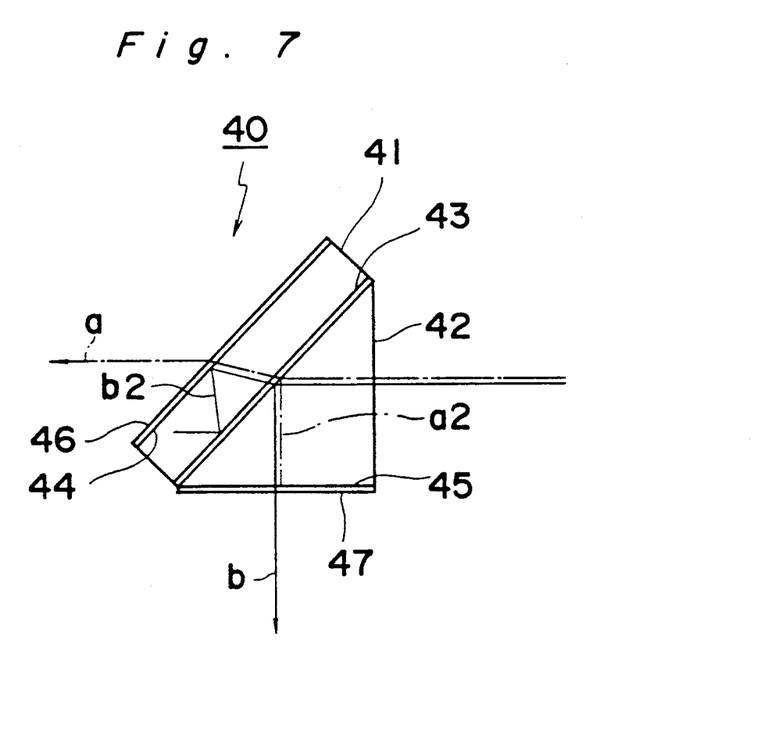
FIG. 7 is an enlarged sectional view showing another beam splitter according to the fourth embodiment.

FIG. 7 is a sectional view showing a beam splitter 40 in the fourth embodiment.

The splitter 40 is a dichroic prism composed of an optical glass plate 41 attached to an optical glass-made rectangular prism 42 and arranged therebetween a first dielectric multilayer film 43 for transmitting the laser beam (a) of the 810 nm wavelength and reflecting the laser beam (b) of the 750 nm wavelength.

On the exit surfaces 44 and 45 each corresponding to the split laser beams (a) and (b), a second and a third dielectric multilayer films 46 and 47 having the wavelength selective characteristics with respect to the laser beams (a) and (b), respectively, are arranged.

The second film 46 has the same characteristic as that of the first film 43, while the third film 47 has the wavelength selective characteristic to reflect the laser beam (a) of the 810 nm wavelength and to transmit the laser beam (b) of the 750 nm wavelength. These films 46 and 47 prevent the poor split beams (a2) and (b2) from transmitting them respectively. Therefore, when the splitter 40 is employed instead of the splitter 11 in the first embodiment shown in FIG. 1, the dichroic mirrors 13 and 14 may be unnecessary.

In order to have no influence to the outside of the apparatus by a scattered beam of the beam, a light-intercepting coating material may be painted on the surface except for the optical paths of the laser beams (a) and (b) of the splitters 20, 30, and 40, or a light-intercepting member may be arranged at the required part in the splitters 20, 30, and 40.

Figure 8:
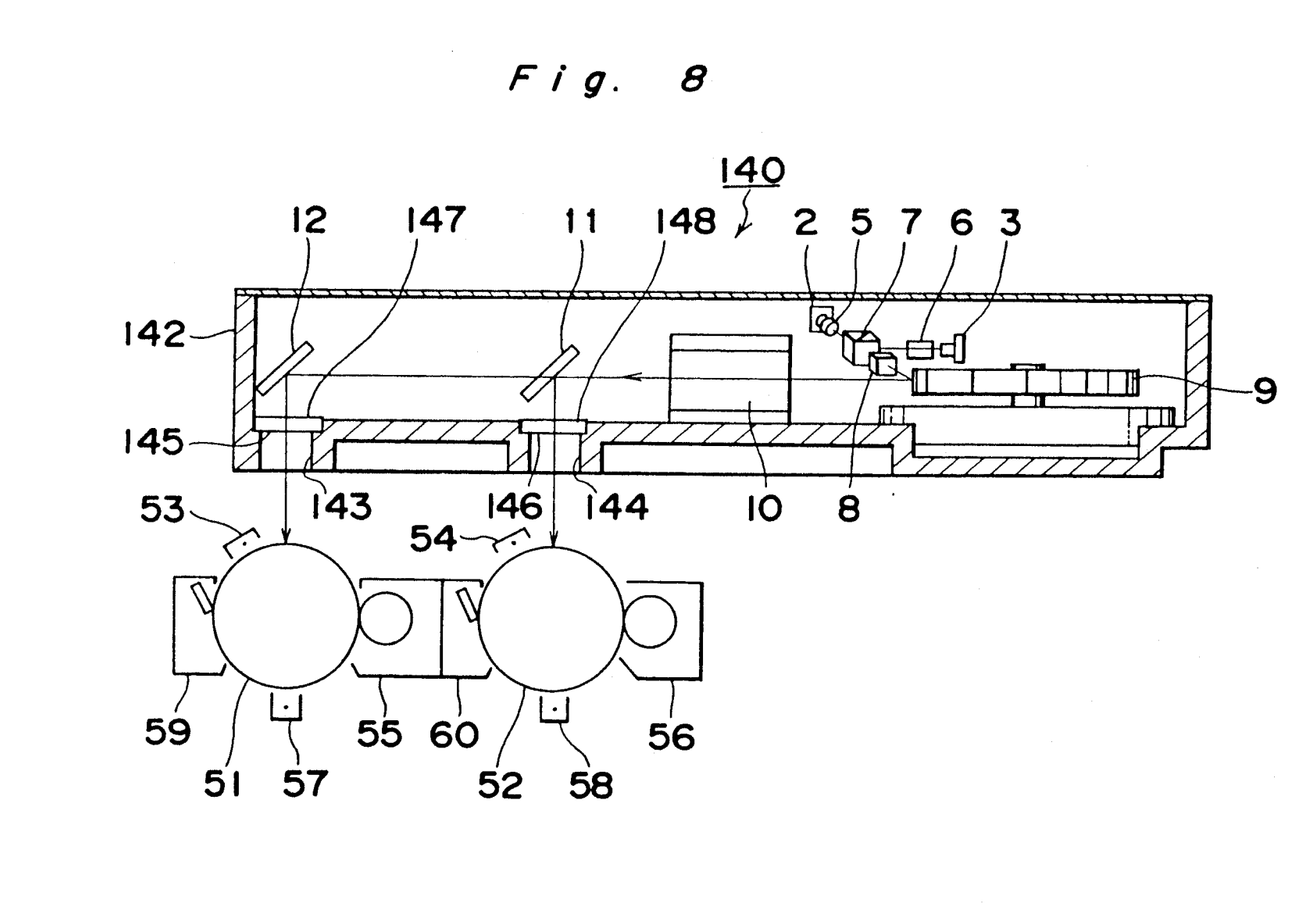
FIG. 8 is an explanatory view showing schematic construction of the apparatus, according to the fifth embodiment, accommodated in a unit.

FIG. 8 is an explanatory view showing the schematic construction of a laser beam scanning apparatus 140 composed a unit in the fifth embodiment.

In the apparatus 140, like parts with the same functions as those of the parts in the apparatus 1 in FIG. 1 are designated by the same reference numerals as the parts in the apparatus 1, and then, the description thereof is omitted hereinbelow. The semiconductor lasers 2 and 3, the collimator lenses 5 and 6, the dichroic prism 7 serving as a beam composition means, the cylindrical lens 8, the polygonal mirror 9, the f-θ lens 10, and the splitter 11 are accommodated in a box-like light-intercepting cover 142 with the mirror 12 so as to compose a unit.

The laser beam scanning apparatus 140 may be employed as an exposure means in an electrophotographic multi-color laser printer having parts such as photosensitive drums 51 and 52 serving as substances to be illuminated, chargers 53 and 54, developing devices 55 and 56, transfer chargers 57 and 58, and cleaning devices 59 and 60.

The box-like light-intercepting cover 142 prevents the laser beams from being incident on eyes of an operator for safety and is convenient for the maintenance for adjusting the optical system after the apparatus is detached from the laser printer.

Exit openings 143 and 144 of the laser beams which are arranged on the bottom of the cover 142 are covered with window glasses 145 and 146 in order to prevent the inside thereof from becoming dirty with toner or dust. The photosensitive drums 51 and 52 are illuminated by each laser beam split by the splitter 11 through these window glasses 145 and 146.

In such a laser beam scanning apparatus 140, dielectric multilayer films 147 and 148 serving as beam-selecting means are evaporated on the inner surface of the window glasses 145 and 146 where toner etc. is not attached.

The film 147 has such a wavelength selective characteristic that the laser beam of the 810 nm wavelength is transmitted it and the laser beam of the 750 nm wavelength is reflected thereby. On the other hand, the film 148 has such a wavelength selective characteristic that the laser beam of the 750 nm wavelength is transmitted it and the laser beam of the 810 nm wavelength is reflected thereby. Therefore, the strength of the poor split beam mixed in the laser beam illuminating on the drums 51 and 52 becomes very small, resulting in the prevention of the occurrence of a ghost.

According to the first to fifth embodiments described above, the beam-selecting means is composed of the dichroic mirror included a partial reflective film composed of a dielectric multilayer film. Therefore the absorption loss becomes very small, and then a sufficient quantity of light may be emitted even from a low powered laser beam source to give the substance to be illuminated.

According to the third embodiment, since the second and third dielectric multilayer films 36 and 37 serving as the beam-selecting means are evaporated on the exit surfaces 34 and 35 of the splitter 30 with the large mechanical strength which is so constructed that the first dielectric multilayer film 33 is arranged between the two prisms 31 and 32, it may effectively use a space in the laser beam scanning apparatus and may keep the angles confronting the splitter 30 with the second and third dielectric multilayer films 36 and 37 constant, resulting in the stability of the wavelength selective characteristic with respect to each split laser beam. This embodiment is specially suitable for the case where the laser beams are comprised or the laser beam is split into plural beams, on the basis of the difference of the polarized direction thereof. These effects also may be obtained in the fourth embodiment shown in FIG. 7.

According to the fifth embodiment, since the function of the dichroic mirror is served on the only plate-like window glasses 145 and 146, not the surface of an optical member such as the splitter 11, it may be easily manufactured and may prevent the number of the component parts from increasing. Furthermore, it may prevent the occurrence of a ghost.

According to the first embodiment, the dichroic mirrors 13 and 14 each employed the partial reflective film with the wavelength selecting characteristic which serves as the beam-selecting means are arranged in the apparatus, so that the laser beam transmitted the mirrors 13 and 14 may illuminate on the different parts of the photosensitive member 4 to be illuminated, respectively. However, in the case where the beam-selecting means is composed of the dichroic mirror, the laser beam reflected by the dichroic mirror may illuminate on the photosensitive member 4 to be illuminated. For example, in the laser beam scanning apparatus 1 shown in FIG. 1, a dichroic mirror with the wavelength selective characteristic as that of the mirror 13 may be employed instead of the dichroic mirror 14, so that the laser beam reflected by the substituted mirror and having the 750 nm wavelength is guided with a mirror etc. suitably arranged to the photosensitive member 4 to be illuminated. According to this arrangement, the dichroic prism 7, the splitter 11, and the dichroic mirrors 13 and 14 serving as the beam-selecting means may be composed of partial reflective films with the same characteristic, respectively, with the result that the manufacturing costs thereof may be reduced, as compared with the case where they are composed of various kinds of partial reflective films (dielectric multilayer films).

In the first embodiment, the one cylindrical lens 8 is arranged with respect to the composite laser beam, with the result that the apparatus is simple in construction. In the arrangement, additionally, this cylindrical lens is arranged near the photosensitive member 4 to be illuminated with respect to each split laser beam to cause the beam to pass it, and thus, partial reflective films with the wavelength selective characteristic with respect to the laser beams may cover the surfaces of the plural cylindrical lenses to form dichroic mirrors. In this case, in order to arrange the beam-selecting means, no new supporting member may be required.

According to the first to fifth embodiments, though the two beam laser sources are employed and the laser beams emitted therefrom have different wavelengths from each other so as to compose the laser beams and to split the beam into plural beams, the same operations as described above also may be obtained by the case where the laser beams emitted therefrom have different polarized directions from each other. In using more than three laser beams, it may be so selected that two laser beams with the same wavelength and the different polarized directions and one laser beam with the wavelength different from the those of the two laser beams may be used. In this case, in correspondence with the characteristic of the laser beam, the wavelength selective characteristic may be selected by the change of the material, thickness, number of layers of the dielectric multilayer film composed the partial reflective film with respect to each member. As the laser beam source, it may be used a solid state laser, a gas laser or a liquid laser, not limited to the semiconductor laser.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A laser beam scanning apparatus comprising:

plural laser beam sources for emitting laser beams modulated by a picture signal and having different characteristics from each other;

a beam composition means for composing the beams emitted from said laser beam sources to form one laser beam;

a deflecting means for deflecting the composite laser beam in a main scanning direction thereof;

a beam splitter for splitting the deflected laser beam on the basis of the characteristic of the laser beam; and a beam-selecting means for selecting the laser beam in correspondence with the characteristic of the laser beam split by said splitter, said beam-selecting means arranged between said splitter and the substance to be illuminated on an optical path of the beam, wherein each split laser beam illuminates on a different part of a substance to be illuminated.

2. A laser beam scanning apparatus as claimed in claim 1, wherein said splitter has a partial reflective film for splitting an incident light into a reflective light and a transmitting light, said beam-selecting means has a partial reflective film with the same characteristic as such a characteristic of the film of said splitter that the reflective light from said splitter is reflected thereby and the transmitting light is transmitted it.

3. A laser beam scanning apparatus as claimed in claim 1, further comprising an optical member for correcting an error of an incline angle of said deflecting means, said member being arranged between said splitter and the substance on the optical path of the laser beam split by said splitter, wherein said beam-selecting means is composed of a partial reflective film covered said optical member.

4. A laser beam scanning apparatus as claimed in claim 1, further comprising a box-like light-intercepting cover for accommodating said sources, said beam composition means, said deflecting means, and said splitter, wherein each laser beam split by said splitter is transmitted a light transmission member covering an exit opening formed on said cover to illuminate on a different part of a substance to be illuminated arranged outside said cover, and said beam-selecting means is a dielectric multilayer film for selectively transmitting the laser beam split by said splitter and then incident on the light transmission member, which is formed on a surface of the light transmission member.

5. A laser beam scanning apparatus as claimed in claim 4, wherein the dielectric multilayer film covers an inner surface of the light transmission member where is located inside said cover.

6. A laser beam scanning apparatus as claimed in claim 1, wherein said beam-selecting means is a dichroic mirror including a dielectric multilayer film.

7. A laser beam scanning apparatus as claimed in claim 1, wherein said beam composition means is composed of a dichroic prism comprising two optical glasses and a partial reflective film for transmitting the laser beam with a specified characteristic and reflecting the laser beam with a characteristic different from that of the transmitted laser beam which is arranged between the prisms.

8. A laser beam scanning apparatus comprising: plural laser beam sources for emitting laser beams modulated by a picture signal and having different characteristics from each other;

a beam composition means for composing the beams emitted from said laser beam sources to form one laser beam;

a deflecting means for deflecting the composite laser beam in a main scanning direction thereof;

a beam splitter for splitting the deflected laser beam on the basis of the characteristic of the laser beam; and a beam-selecting means for selecting the laser beam in correspondence with the characteristic of the laser beam split by said splitter, wherein each split laser beam illuminates on a different part of a substance to be illuminated, said splitter is so constructed that two optical glass-made prisms are closely attached to each other and a first dielectric multilayer film for transmitting the laser beam with a specified characteristic and reflecting the laser beam with a characteristic different from that of the transmitted laser beam is arranged therebetween, a second dielectric multilayer film for selectively transmitting the laser beam covers an exit surface of said splitter where the laser beam transmitted the first dielectric multilayer film falls on, and said beam-selecting means are the first and second dielectric multilayer films.

9. A laser beam scanning apparatus comprising:
plural laser beam sources for emitting laser beams modulated by a picture signal and having different characteristics from each other;

a beam composition means for composing the beams emitted from said laser beam sources to form one laser beam;

a deflecting means for deflecting the composite laser beam in a main scanning direction thereof;

a beam splitter for splitting the deflected laser beam on the basis of the characteristic of the laser beam; and a beam-selecting means for selecting the laser beam in correspondence with the characteristic of the laser beam split by said splitter, wherein each split laser beam illuminates on a different part of a substance to be illuminated, said splitter is so constructed that two optical glass-made prisms are closely attached to each other and a first dielectric multilayer film for transmitting the laser beam with a specified characteristic and reflecting the laser beam with a characteristic different from that of the transmitted laser beam is arranged therebetween, a third dielectric multilayer film for selectively transmitting the laser beam covers an exit surface of said splitter where the laser beam reflected by the first dielectric multilayer film falls on, and said beam-selecting means are the first and third dielectric multilayer films.

10. A laser beam scanning apparatus comprising:
plural laser beam sources for emitting laser beams modulated by a picture signal and having different characteristics from each other;

a beam composition means for composing the beams emitted from said laser beam sources to form one laser beam;

a deflecting means for deflecting the composite laser beam in a main scanning direction thereof;

a beam splitter for splitting the deflected laser beam on the basis of the characteristic of the laser beam; and a beam-selecting means for selecting the laser beam in correspondence with the characteristic of the laser beam split by said splitter, wherein each split laser beam illuminates on a different part of a substance to be illuminated, said splitter is composed of a flat optical glass of which a plane of incidence and an exit surface are covered with dielectric multilayer films for transmitting the laser beam with a specified characteristic and reflecting the laser beam with a characteristic different from that of the transmitted laser beam, respectively, and said beam-selecting means are the films.

11. A laser beam scanning apparatus as claimed in claim 8, wherein said splitter is a dichroic prism of which the optical prisms are rectangular prisms.

12. A laser beam scanning apparatus as claimed in claim 9, wherein said splitter is a dichroic prism of which the optical prisms are rectangular prisms.

13. A laser beam scanning apparatus as claimed in claim 8, wherein said splitter is a dichroic prism of which the optical prisms are a rectangular prism and a flat glass.

14. A laser beam scanning apparatus as claimed in claim 9, wherein said splitter is a dichroic prism of which the optical prisms are a rectangular prism and a flat glass.

15. A laser beam scanning apparatus comprising:
- a laser beam source for emitting laser beams modulated by a picture signal and having different characteristics from each other;
- a deflecting means for deflecting the laser beams in a main scanning direction thereof;
- a beam splitter for splitting the deflected laser beams on the basis of the characteristic of the laser beam, and
- a beam-selecting means for selecting the laser beams corresponding with the characteristic of the laser beam split by said splitter, said beam-selecting means arranged between said splitter and a substance to be illuminated on an optical path of the beam, wherein each split laser beam illuminates on a different part of the substance to be illuminated.

* * * * *